United States Patent
Petasch et al.

(10) Patent No.: US 6,870,632 B2
(45) Date of Patent: Mar. 22, 2005

(54) APPARATUS FOR MOUNTING AN OPTICAL ELEMENT IN AN OPTICAL SYSTEM

(75) Inventors: Thomas Petasch, Aalen (DE);
Hartmut Muenker, Hilchenbach-Dahlbruch (DE);
Klaus-Dieter Klein, Koenigsbronn (DE)

(73) Assignee: Carl Zeiss SMT AG (DE)

( * ) Notice: Subject to any disclaimer, the term of this patent is extended or adjusted under 35 U.S.C. 154(b) by 321 days.

(21) Appl. No.: 10/108,878

(22) Filed: Mar. 27, 2002

(65) Prior Publication Data

US 2002/0176094 A1 Nov. 28, 2002

(30) Foreign Application Priority Data

May 30, 2001 (DE) .......................................... 101 15 914

(51) Int. Cl.[7] .............................. G01B 7/02; G01B 11/14
(52) U.S. Cl. ...................... 356/614; 359/819; 359/820
(58) Field of Search .................................. 359/819–820

(56) References Cited

U.S. PATENT DOCUMENTS

| | | | | |
|---|---|---|---|---|
| 5,428,482 | A | | 6/1995 | Bruning et al. ............. 359/827 |
| 6,392,825 | B1 | * | 5/2002 | Trunz et al. ................ 359/819 |
| 6,473,247 | B1 | * | 10/2002 | Keller et al. ................ 359/819 |
| 6,501,605 | B2 | * | 12/2002 | Moriya ....................... 359/819 |

FOREIGN PATENT DOCUMENTS

| | | |
|---|---|---|
| CH | 371906 | 10/1963 |
| DE | 3406907 A 1 | 10/1984 |
| DE | 3615930 A1 | 12/1986 |
| DE | 3740515 A1 | 6/1989 |
| DE | 4236355 A1 | 5/1994 |
| DE | 199 10 947 A 1 | 9/2000 |
| EP | 0 053 463 A2 | 6/1982 |
| EP | 0 230 277 A2 | 7/1989 |
| EP | 0471362 B1 | 11/1996 |
| EP | 0 964 281 A1 | 12/1999 |
| EP | 198 25 716 A 1 | 12/1999 |
| EP | 1 209 500 A2 | 5/2002 |

OTHER PUBLICATIONS

U.S. Appl. No. 10/106,962, filed Mar. 25, 2002, Petasch et al.

* cited by examiner

*Primary Examiner*—Zandra V. Smith
(74) *Attorney, Agent, or Firm*—Wells St. John P.S.

(57) ABSTRACT

An apparatus or mounting an optical element in an optical system, in particular a mirror or a lens, in a projection exposure machine, in particular a projection lens in semiconductor lithography, is connected to an external base structure with the aid of at least three articulation sites that are arranged on the circumference of the optical element and at which a bearing device acts in each case, wherein the bearing device has at least one bending element, resembling a leaf spring, arranged tangentially to the optical element, and at least one bending element, resembling a leaf spring, arranged in the radial direction relative to the optical element.

26 Claims, 3 Drawing Sheets

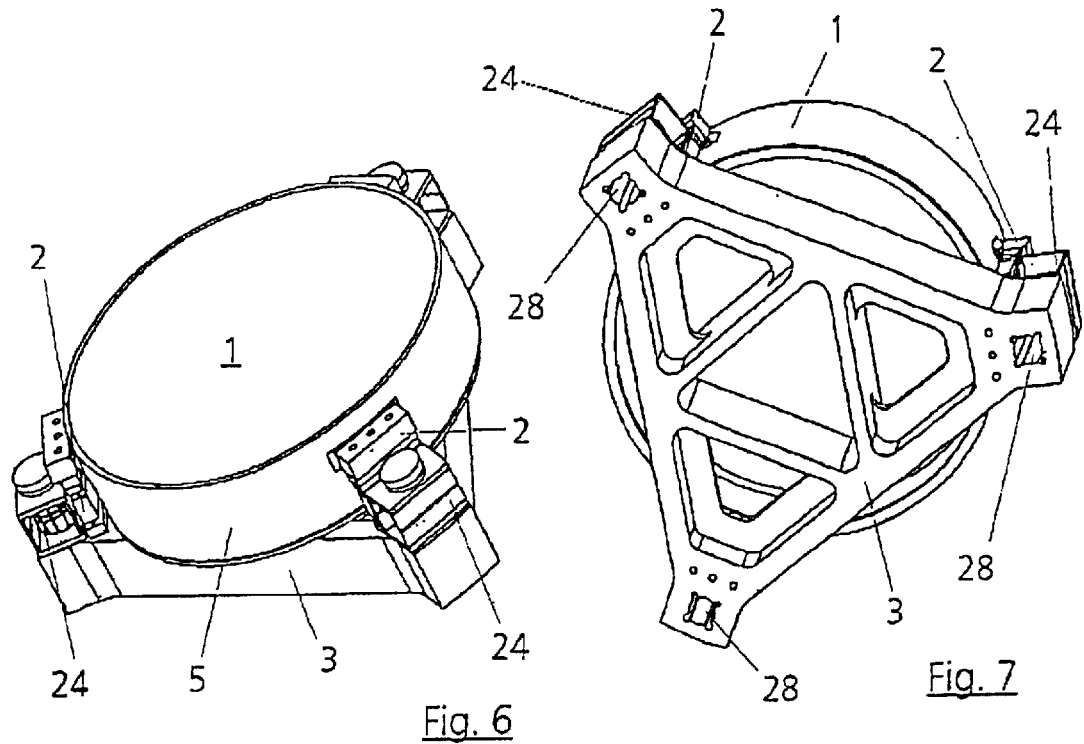
Fig. 6
Fig. 7
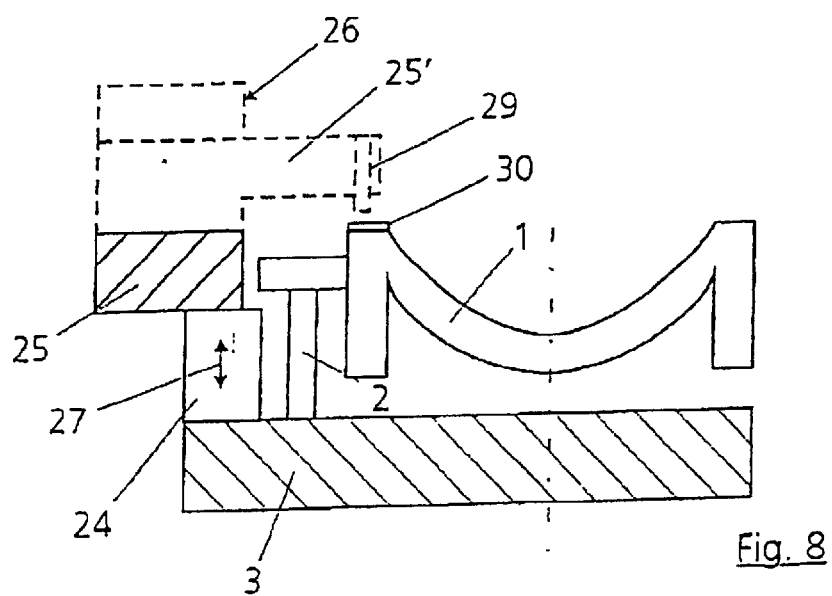
Fig. 8

APPARATUS FOR MOUNTING AN OPTICAL ELEMENT IN AN OPTICAL SYSTEM

RELATED APPLICATION

This application relates to and claims priority to corresponding German Patent Application No. 101 15 914.5 filed on Mar. 30, 2001.

BACKGROUND OF THE INVENTION

1. Field of the Invention

The invention relates to an apparatus for mounting an optical element in an optical system.

More specifically the invention relates to an apparatus for mounting a mirror or a lens in a projection objective of a projection exposure machine in semiconductor lithography.

2. Description of the Related Art

Optical elements, such as mirror and lenses, in optics, in particular in semiconductor lithography, are to be mounted isostatically and therefore in a fashion decoupled in terms of deformation such that disturbances acting from outside as far as possible do not act on the optical element. It is known for this purpose to mount the optical element in an appropriately "soft" fashion. The problem with a soft bearing consists, however, in that sufficiently high natural frequencies are not reached.

SUMMARY OF THE INVENTION

The present invention is therefore based on the object of creating an apparatus for mounting an optical element that, on the one hand, exerts few or small forces on the optical element, that is to say is very well decoupled in terms of deformation, a high natural frequency being reached, however, on the other hand. In particular, disturbances acting from outside should not effect surface deformations on the optical element, but—if at all—a movement of the entire body.

According to the invention, this object is achieved by an apparatus having at least three articulation sites arranged on a circumference of the optical element and at which there acts in each case one bearing device which is connected to an external base structure on the side averted from the articulation site, wherein the bearing device has at least one bending element, resembling a leaf spring, arranged tangentially to the optical element, and at least one bending element, resembling a leaf spring, arranged in the radial direction relative to the optical element.

Further, according to a preferred mode of the invention the optical element is a lens or a mirror in a projection objective of a projection exposure machine in semiconductor lithography.

A stiff construction with high natural frequencies resulting therefrom can be achieved with the aid of the configuration according to the invention in conjunction with a relatively compact design. However, mounting can be accomplished with few components, a monolithic design being possible if required.

Generally, three bearing devices arranged and distributed over the circumference will suffice.

A very advantageous refinement of the invention can consist in that the bearing device has two bending elements, arranged parallel to the z-direction (optical axis) at a spacing from one another and running in the tangential direction, with an adapter arranged therebetween.

Each bearing device in this way has, for example, two leaf springs arranged at a spacing from one another and running in the tangential direction, and a leaf spring running in the radial direction, as transverse articulation. The adapter arranged between the two leaf springs running in the tangential direction can be stiff, or else—in a very advantageous and not obvious development of the invention—be designed as a manipulator device. In this case, the adapter can be provided with an adjusting device for changing the length parallel to the z-direction.

A possible refinement for this purpose resides in a design resembling a parallelogram or a design comparable to the scissor-type jack principle. It is possible in this way for the length of the adapter or adapters arranged distributed over the circumference to be changed very sensitively—with or without a transmission. If all the adapters of the bearing devices have their length changed uniformly, the optical element is thereby displaced in the z-direction. In the event of individual changes in length, the optical element can be tilted appropriately in this way.

In a very advantageous development of the invention, it can be provided that the external base structure to which the optical element is connected via the bearing device is connected via manipulators to a fixed housing structure of the optical system, the manipulators being supported on the housing structure.

According to the invention, the mirror is mounted isostatically, the effect of the arrangement of the manipulators being that no negative change in the natural frequency is accomplished. This affects its mode of operation via the external base structure. The torques and forces of the manipulators are introduced into the external base structure and therefore exert no effects on the optical element. In practice, the base structure, which is generally of very stiff design, serves for decoupling the restoring forces of the manipulators.

In order to achieve an alignment and/or adjustment of the optical element in the axial direction and/or in the direction of the optical axis (z-axis), three manipulators arranged uniformly distributed over the circumference can be arranged on the housing structure. If the manipulators are actuated individually, tiltings are achieved about the z-axis or optical axis. If all three manipulators are actuated in the same way, this results in a displacement of the optical element in the z-direction.

The manipulators are supported on a fixed housing structure of the optical system, which can serve simultaneously as an interface structure, for example in an annular shape.

In a further advantageous refinement of the invention, it can be provided that sensors that co-operate with the mating elements arranged on the optical element are arranged on the housing structure for the purpose of determining the position of the optical element in the optical system.

Owing to this refinement, the optical element can be adjusted or set in a defined fashion in a lens. For this purpose, the actual position is detected by the sensors, whereupon a desired position is set.

Owing to the sensors according to the invention, which can, for example, be three contactless distance measuring sensors arranged distributed over the circumference, there is a direct and therefore more accurate measurement instead of a measurement via the travel of the manipulators.

The most varied sensors can be used as sensors such as, for example, contactless distance measuring sensors. Possible here, for example, are capacitive sensors, or else a distance measuring interferometer, which act on mating surfaces of the optical element. The mating surface be vapor-deposited for this purpose, for example, onto the optical element in an optically inactive region.

Additional advantages of the present invention will become apparent to those skilled in the art from the following detailed description of exemplary embodiments of the present invention.

BRIEF DESCRIPTION OF THE DRAWINGS

FIG. 6 shows a perspective view of the optical element with the bearing device and with manipulators (without fixed housing structure) from above, FIG. 7 shows a perspective view of the apparatus according to the invention in accordance with FIG. 6, from below, and FIG. 8 Shows a section through the apparatus according to FIGS. 6 and 7 with a fixed housing structure for supporting the manipulators and with a sensor device.

DETAILED DESCRIPTION

An optical element, for example a mirror 1, is connected to an external base structure 3 by three bearing devices 2 arranged uniformly distributed over the circumference. The base structure 3 can be part of an optical system, for example a projection lens in semiconductor lithography. The illustrated triangular shape of the base structure is to be recorded merely by way of example. If required, other shapes such as, for example, a circular one are possible here.

Figure 2:
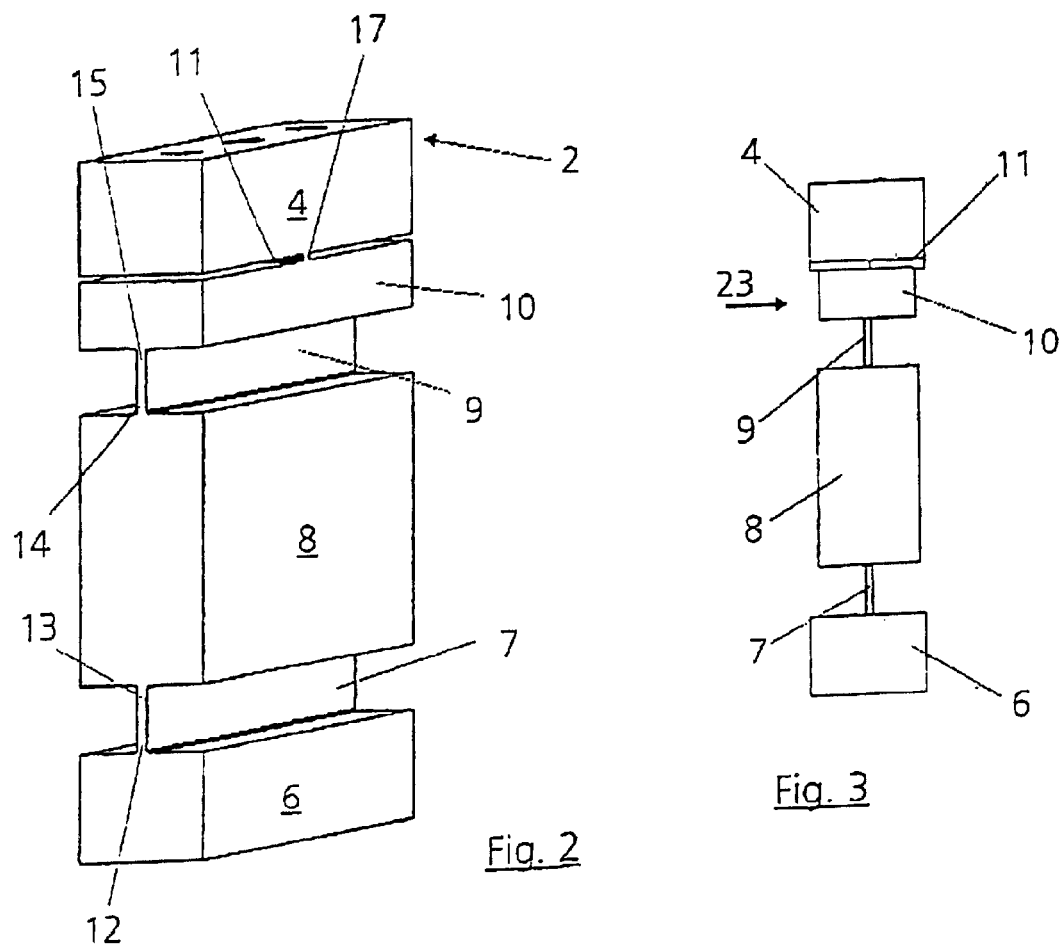
FIG. 2 shows a bearing device in a perspective and enlarged illustration.
Figure 3:
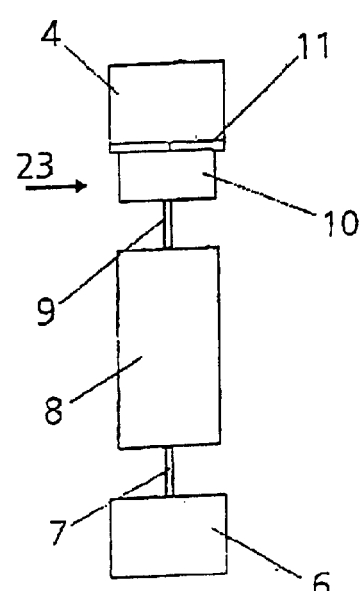
FIG. 3 shows a side view of the bearing device from the direction A of the arrow in FIG. 1.

The bearing devices 2 are designed such that they are very strongly decoupled in terms of deformation and therefore do not pass disturbances acting from outside via the base structure 3 onto the optical element 1. The base structure is of very stiff design (preferably being ceramic), in order to decouple forces coming from outside as effectively as possible from the bearing elements and the mirror. A two-fold decoupling deformation is achieved in this way. A first embodiment of a bearing device 2 is illustrated in FIGS. 2 to 3 in an enlarged illustration. As may be seen, the bearing device is designed monolithically or in one piece with solid articulations between individual moveable parts. It has an upper fastening part 4, with the aid of which the bearing device 2 is connected via an articulation site 4a to a barrel 5 of the optical element 1. Preferably, the fastening part 4 can also be connected directly to the optical element 1. The bearing device 2 is connected via a connecting part 6 to the base structure 3 on the underside or on the side averted from the articulation site 4a. Connected to the connecting part 6 is a first bending articulation 7, which is in the form of a leaf spring 7 and is arranged tangentially to the barrel 5 or the optical element 1. On the side averted from the connecting part 6, the leaf spring 7 is connected to a stiff adapter 8 as an anti-buckling part that is connected, in turn, on the side averted from the leaf spring 7 to a further bending element 9 likewise in the form of a leaf spring. The leaf spring 9 likewise extends with its longitudinal axis tangentially to the barrel 5 or the optical element 1. The leaf spring 9 is connected on the side averted from the adapter 8 to a transition plate 10. The transition plate 10 is connected to the fastening part 4 via, as transverse articulation, a bending element 11 running in the radial direction—referred to the optical element.

As may be seen, the leaf spring 7 is thereby connected to the connecting part 6 via a solid articulation 12, and to the adapter 8 via a solid articulation 13. In the same way, the leaf spring 9 is connected to the adapter 8 via a solid articulation 14, and to the transition plate 10 via a solid articulation 15. On the basis of its small axial extent, the bending element 11 acts overall as a solid articulation 17. Of course, a larger axial extent is also possible here within the scope of the invention. The same holds vice versa for the two leaf springs 7 and 9.

If required, the bearing devices 2 can be displaced axially both individually and jointly by means of manipulators not illustrated in more detail, the displacement then being passed—according to the direction of action—onto the optical element 1 via the leaf springs 7 or 9 responding thereto or the bending element 11 and/or the solid articulations. With this configuration, virtually every bearing device 2 constitutes a gimbal for the element 1. An adequate stiffness against natural frequencies is, however, given on the basis of the solid articulations.

Figure 1:
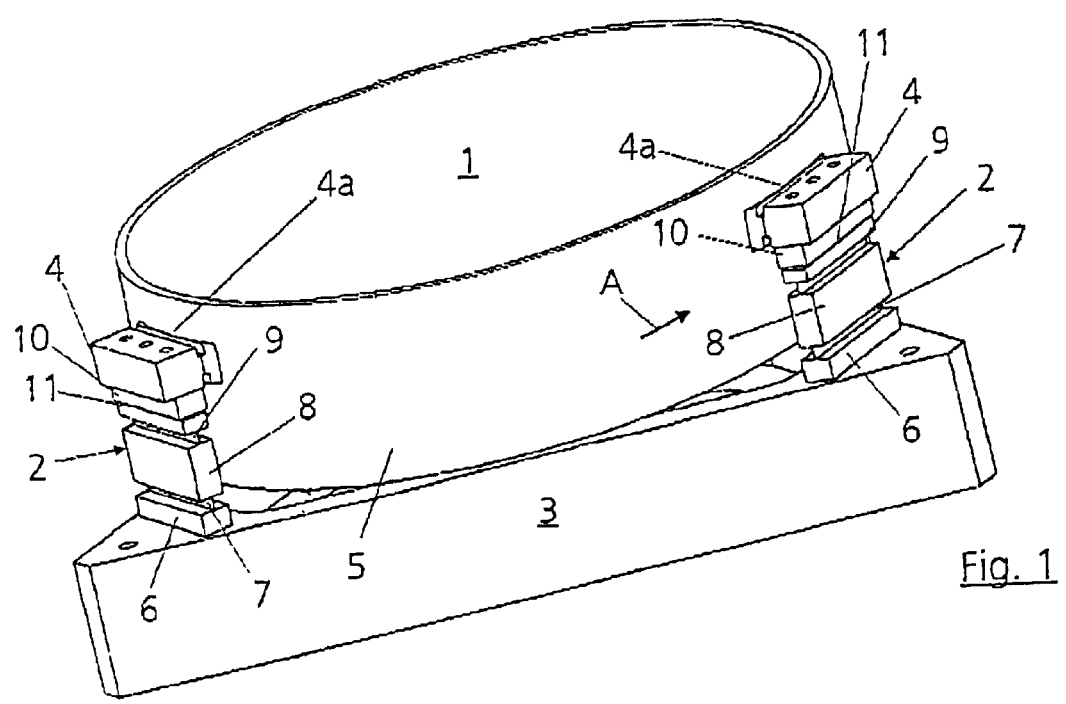
FIG. 1 shows a perspective illustration of the apparatus according to the invention for mounting an optical element.
Figure 4:
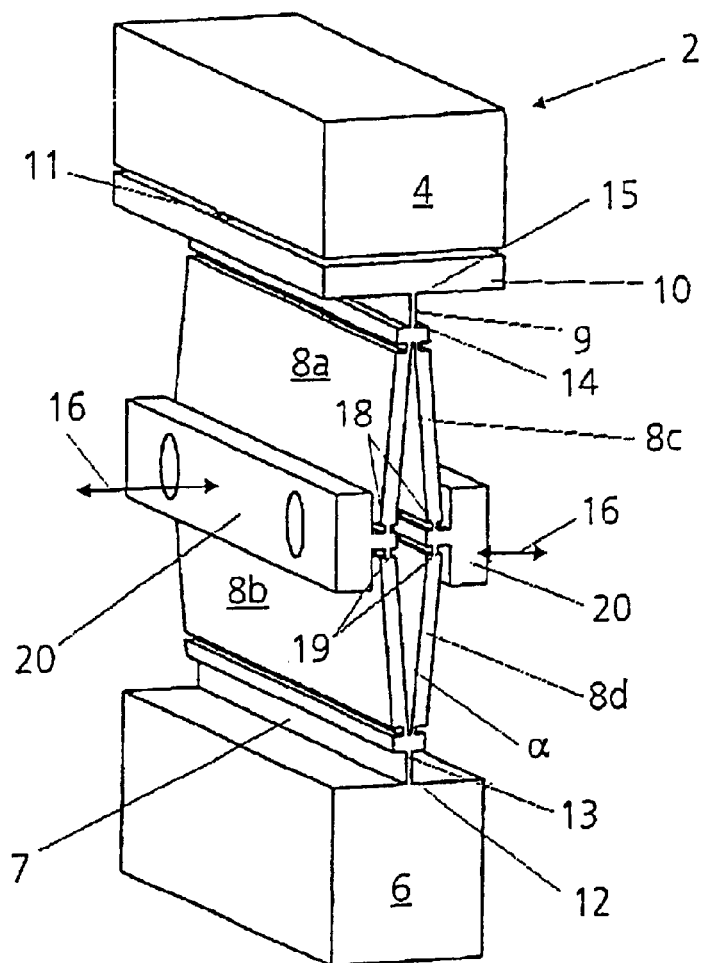
FIG. 4 shows a bearing device in a perspective and enlarged illustration in another exemplary embodiment.

FIG. 4 shows a configuration of a bearing device 2 in another refinement. In principle, the design is identical to the bearing device according to FIGS. 1 to 3, for which reason the same reference numerals have also been retained for the same parts. The only difference is that the stiff adapter 8 has been replaced by a parallelogram with the four sides 8a, 8b, 8c and 8d. The parallelogram sides 8a and 8b located on one side are connected to one another by means of solid articulations 18 and 19. The same holds for the parallelogram sides 8c and 8d, which are located on the other side. An actuator element 20 is located in each case between the solid articulations 13 and 19. If an actuating device (not illustrated in more detail) exerts forces on the actuator elements 20 in a direction 16 of an arrow, the aperture angle α of the parallelogram 15 varied, which produce an adjusting device. The displacement path, which changes the height of the optical element 1 in the z-direction (optical axis) is increased or decreased correspondingly depending on the aperture angle α. Given a small aperture angle α, a correspondingly strong increase is achieved, while given an aperture angle of 45° the transmission ratio is 1:1, and given a larger aperture angle α the transmission ratio is correspondingly larger.

Figure 5:
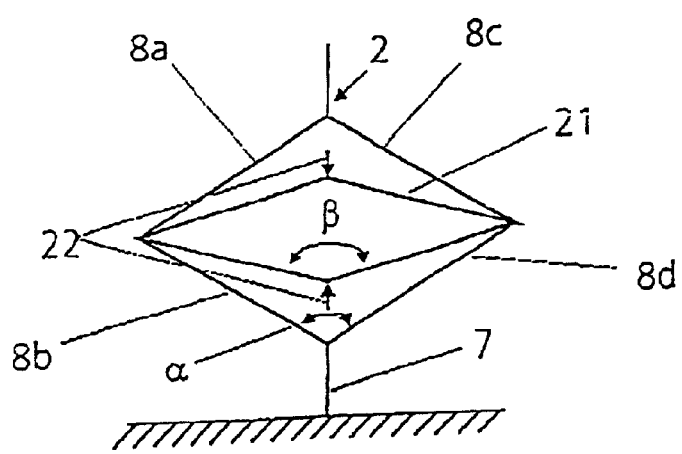
FIG. 5 shows an Illustration of the principle of a bearing device in a third embodiment.

Since it is generally desired to achieve a very sensitive adjustment in the z-direction (optical axis), it can be advantageous if a further reduction is undertaken by means of a second parallelogram 21 with a corresponding number of four parallelogram sides, which is located in the interior of the parallelogram with the sides 8a to 8d (see FIG. 5) and which acts as a further adjusting device. Displacement forces made by actuator elements 22 in accordance with the direction of the arrows onto the interior of the parallelogram 21 have a correspondingly reducing action on the external parallelogram with the sides 8a to 8d. In this process, the displacement forces 22 respectively act laterally between the parallelogram sides 8a and 8b or 8c and 8d and thereby change the aperture angle β of the inner parallelogram 21 and thereby also the aperture angle α very sensitively.

The adjusting movement can be linearized by means of the second parallelogram, specifically by optimizing the aperture angles α and β.

FIGS. 6 to 8 illustrate a development of the invention, it being possible for the optical element 1 to be adjusted in the axial direction by means of three manipulators 24 arranged uniformly distributed over the circumference. Also illustrated in FIG. 8 is a sensor device with the aid of which the respective position of the optical element 1 can be checked exactly.

As may further be seen from FIG. 8, the manipulators 24 are supported on a fixed housing structure 25 of the optical system, for example a lens 26 (illustrated only partially). As may be seen, the manipulators 24 supported on the housing structure 25 act via the base structure 3 on the bearing device 2 (illustrated only in principle in FIG. 8, for the purpose of simplification), and thus on he optical element 1. Since the base structure 3 can be of very stiff design, for example made from ceramic material, it can serve the purpose of decoupling the restoring forces of the manipulators 24.

The manipulators 24 are indicated only in principle in FIGS. 6 to 8, since they can be replaced at will by the most varied motors or adjusting devices that produce axial changes in length in accordance with arrow 27. Thus, for example, piezoceramic actuators are possible which experience changes in length in the event of an application of a voltage. The manipulators 24, that are connected at one end to the housing structure 25 and at the other end to the base structure 3, can be inserted from below, for example in each case through an opening 28 in the region of the corners of the triangular base structure 3 (see FIG. 7).

In order to detect the actual position of the optical element 1 and then to be able to set a desired position correspondingly as exactly as possible, after appropriate actuation of the manipulators 24, three sensors 29 arranged distributed over the circumference are, for example, provided on the fixed housing structure 25. For this purpose, it is possible, for example, for the housing structure 25, which can also serve as interface ring, to be provided with an inwardly directed extension 25' (illustrated only by dashes) in or on which the sensors 29 are then mounted.

The sensors 29 operate with mating elements 30 that are arranged oppositely in an appropriate fashion on the optical element 1 outside the optically active region.

Capacitive sensors, for example, or else distance measuring interferometers that operate without contact can be used, for example, as sensor devices. The mating elements 30 on the optical element 1 can in this case be vapor-deposited as conducting mating surfaces on the optical element 1.

| List of reference numerals | | |
|---|---|---|
| 1 | | optical element |
| 2 | | bearing devices |
| 3 | | base structure |
| 4 | | fastening part |
| 5 | | barrel |
| 6 | | connecting part |
| 7 | | leaf spring |
| 8 | | adapter |
| 8a, 8b, 8c, 8d | | parallelogram sides |
| 9 | | leaf spring |
| 10 | | transition plate |
| 11 | | transverse articulation |
| 12 | | solid articulation |
| 13 | | solid articulation |
| 14 | | solid articulation |
| 15 | | solid articulation |
| 16 | | direction of arrow |
| 17 | | solid articulation |

| -continued | |
|---|---|
| List of reference numerals | |
| 18 | solid articulation |
| 19 | solid articulation |
| 20 | actuator element |
| 21 | parallelogram |
| 22 | direction of arrow |
| 23 | direction of arrow |
| 24 | manipulators |
| 25 | fixed housing structure |
| 25' | inwardly directed extension |
| 26 | optical system (lens) |
| 27 | arrow (axial changes in length) |
| 28 | aperture |
| 29 | sensors |
| 30 | mating elements |

What is claimed is:

1. An apparatus for mounting an optical element in an optical system, having at least three articulation sites arranged on a circumference of the optical element and at which there acts in each case one bearing device which is connected to an external base structure on the side averted from the articulation site, wherein the bearing device has at least one bending element, comprising a leaf spring, arranged tangentially to the optical element, and at least one bending element, comprising a leaf spring, arranged in the radial direction relative to the optical element.

2. The apparatus as claimed in claim 1, wherein said optical element is a mirror or a lens.

3. The apparatus as claimed in claim 1, wherein said bearing device has two bending elements arranged parallel to an optical axis of the optical element at a spacing from one another and running in the tangential direction, with an adapter arranged therebetween.

4. The apparatus as claimed in claim 3, wherein said bending elements are respectively connected to parts situated adjacent thereto via solid articulations.

5. The apparatus as claimed in claim 3, wherein said adapter is provided with a device for changing the length of the adapter parallel to the optical axis.

6. The apparatus as claimed in claim 5, wherein the device for changing the length comprises at least one shape that resembles a parallelogram with sides and whose aperture angle α can be adjusted by the adjusting device.

7. The apparatus as claimed in claim 6, wherein said sides resembling a parallelogram are respectively connected to one another via solid articulations.

8. The apparatus as claimed in claim 7, wherein an actuator element acts in each case between the parallelogram sides located on one side.

9. The apparatus as claimed in claim 6, wherein arranged in the interior of the parallelogram is a further adjusting device comprising a parallelogram that acts in each case between the parallelogram sides on either side in order to change the aperture angle α, wherein the further adjusting device is provided with an actuator element.

10. The apparatus as claimed in claim 5, wherein said adjusting devices of said bearing devices arranged distributed over the circumference are adjustable individually.

11. The apparatus as claimed in claim 5, wherein said adjusting devices of said bearing devices arranged distributed over the circumference are adjustable jointly.

12. The apparatus as claimed in claim 1, wherein three bearing devices arranged distributed over the circumference are provided.

13. The apparatus as claimed in claim 1, wherein said bearing devices are of monolithic design.

14. The apparatus as claimed in claim 1, wherein said base structure on which said bearing device is supported is designed as a stiff structure.

15. The apparatus as claimed in claim 14, wherein said structure is a ceramic structure.

16. The apparatus as claimed in claim 1, wherein said external base structure to which the optical element is connected via the bearing device is connected via manipulators to a fixed housing structure of the optical system, the manipulators being supported on the housing structure.

17. The apparatus as claimed in claim 16, wherein said manipulators are provided for adjusting the base structure in the axial direction.

18. The apparatus as claimed in claim 17, wherein said housing structure is provided with three manipulators arranged uniformly distributed over the circumference.

19. The apparatus as claimed in claim 16, wherein said housing structure is provided with sensors that cooperate with mating elements arranged on the optical element for the purpose of determining the position of the optical element in the optical system.

20. The apparatus as claimed in claim 19, wherein said sensors are designed as contactless distance measuring sensors arranged distributed over the circumference of the housing structure.

21. The apparatus as claimed in claim 19, wherein said sensors are designed as distance measuring interferometers arranged distributed over the circumference of the housing structure.

22. The apparatus as claimed in claim 19, wherein said mating elements are designed as mating surfaces that are arranged outside the optically active region on the optical element.

23. The apparatus as claimed in claim 22, wherein said mating surfaces are vapor-deposited onto the optical element in the case of capacitive sensors or in the case of distance measuring interferometers.

24. The apparatus as claimed in claim 19, wherein said adjusting devices of said bearing devices arranged distributed over the circumference are adjustable individually.

25. The apparatus as claimed in claim 9, wherein said adjusting devices of said bearing devices arranged distributed over the circumference are adjustable jointly.

26. An apparatus for mounting an optical element in an optical system, having at least three articulation sites arranged on a circumference of the optical element and at which there acts in each case one bearing device which is connected to an external base structure on the side averted from the articulation site, wherein the bearing device has at least one bending element, comprising a leaf spring, arranged tangentially to the optical element, and at least one bending element, comprising a leaf spring, arranged in the radial direction relative to the optical element; and wherein said optical system is a projection objective of a projection exposure machine in semiconductor lithography.

* * * * *

UNITED STATES PATENT AND TRADEMARK OFFICE
CERTIFICATE OF CORRECTION

PATENT NO. : 6,870,632 B2  Page 1 of 1
DATED : March 22, 2005
INVENTOR(S) : Thomas Petasch et al.

It is certified that error appears in the above-identified patent and that said Letters Patent is hereby corrected as shown below:

<u>Title page,</u>
Item [57], ABSTRACT,
Line 1, replace "An apparatus or mounting an optical element in an optical" with -- An apparatus for mounting an optical element in an optical --.

<u>Column 3,</u>
Line 28, replace "FIG. 8 Shows a section through the apparatus according" with -- FIG. 8 shows a section through the apparatus according --.

<u>Column 4,</u>
Line 38, replace "articulations 13 and 19. If an actuating device (not illustrated" with -- articulations 18 and 19. If an actuating device (not illustrated --.
Line 41, replace "parallelogram 15 varied, which produce an adjusting device." with -- parallelogram is varied, which produce an adjusting device. --.

<u>Column 5,</u>
Line 14, replace "simplification), and thus on he optical element 1. Since the" with -- simplification), and thus on the optical element 1. Since the --.

<u>Column 8,</u>
Line 9, replace "24. The apparatus as claimed in claim 19, wherein said" with -- 24. The apparatus as claimed in claimed in claim 9, wherein said --.

Signed and Sealed this

Sixth Day of June, 2006

JON W. DUDAS
*Director of the United States Patent and Trademark Office*